Patented Dec. 20, 1932

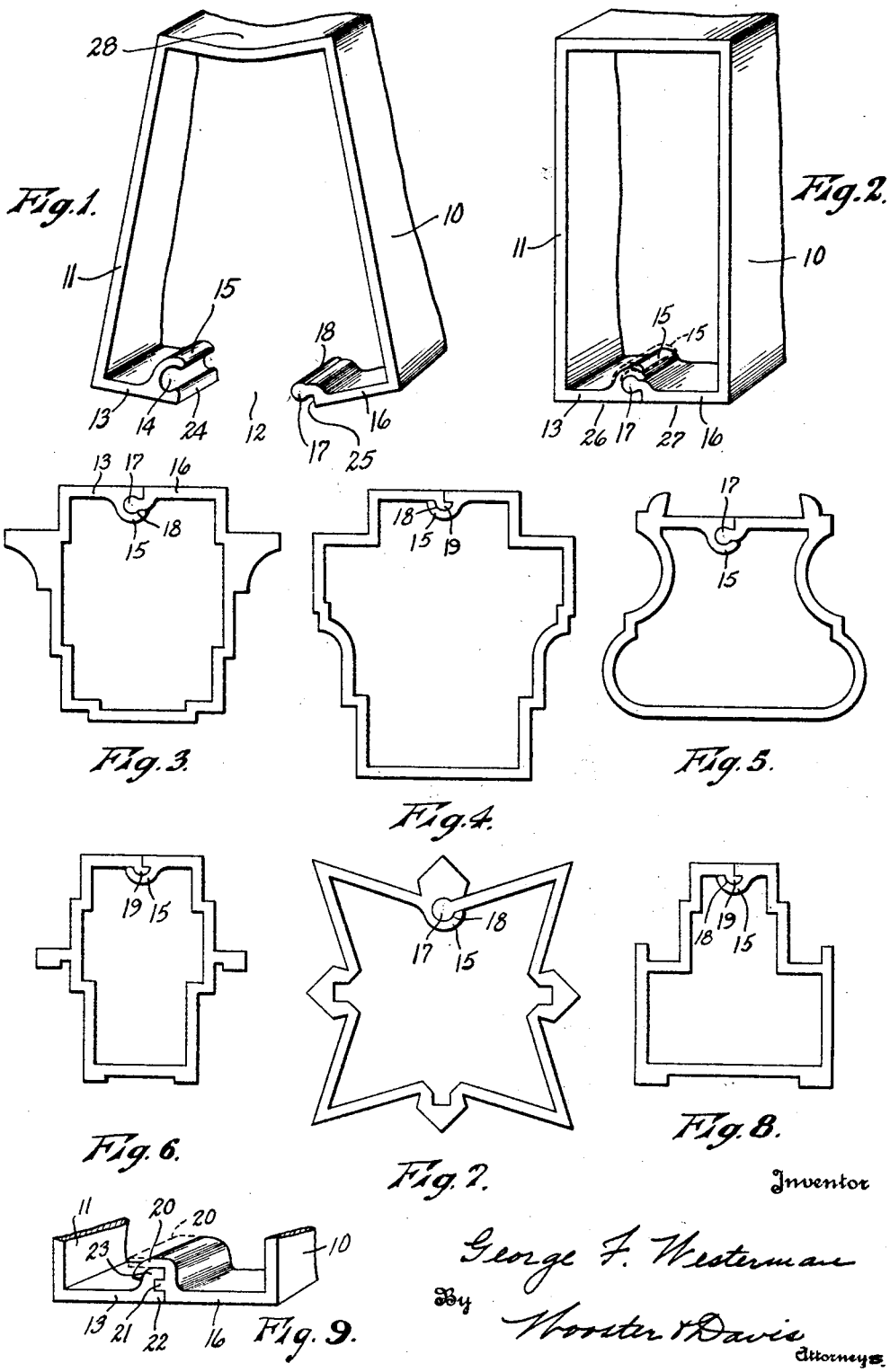

1,891,740

UNITED STATES PATENT OFFICE

GEORGE F. WESTERMAN, OF ANSONIA, CONNECTICUT, ASSIGNOR TO THE AMERICAN BRASS COMPANY, OF WATERBURY, CONNECTICUT, A CORPORATION OF CONNECTICUT

EXTRUDED SHAPES WITH INTERLOCKED JOINTS AND METHOD OF MAKING

Application filed November 18, 1930. Serial No. 496,422.

This invention relates to the manufacture of extruded shapes, particularly tubular shapes and the method of making them.

Up to the present time, as far as I am aware, there has been no commercially practical way of extruding closed tubular sections of any considerable length particularly where such metals as the bronzes were used for the metals to be extruded. I have, however, devoloped a new section construction which can be extruded and when completed is practically as strong as a seamless section, and as adaptable for the uses to which these shapes are employed as is a seamless shape.

It is, therefore, an object of the invention to provide an improved section which may be effectively extruded to practically any length desired and in an open conditon, and can later be closed and the open sides interlocked in such a manner that the finished tubular shape is practically the equivalent of a seamless tubular shape.

With the foregoing and other objects in view I have devised a construction and method of making the same, examples of which are illustrated in the accompanying drawing, it being of course understood that various modifications may be employed without departing from the principles of the invention.

In this drawing:

Fig. 1 is a perspective view of the end portion of an extruded shape showing the form in which it is extruded.

Fig. 2 is a similar view showing the shape completed.

Figs. 3 to 8 inclusive are end views of various shapes giving examples of different types of shapes which may be extruded by this method, and Fig. 9 is a perspective view of a portion of an end of an extruded shape showing a somewhat different construction of interlocking joint which may be used.

It is well known that in extruding such metals as bronze in making various shapes such as bars and irregular shapes, a block of the metal is heated to the proper temperature and then forced under very high pressure through a properly shaped die. It will be evident that due to this high pressure the dies must be very strongly constructed and up to the present time no commercially practical method has been devised for extruding closed tubular shapes of any considerable length because of the difficulty of supporting the central portion of the die. I have overcome this difficulty by extruding the shape as an integral member with a longitudinal gap along one side. That is, along one side the walls are separated to provide a longitudinal gap with interlocking complementary members such as a groove along one edge of this gap and a lip or tongue to seat in this groove along the other edge of this gap. Then, after the section has been extruded in this open condition the sides are forced together to close the gap with the complementary members together and a rib or flange on one side of the groove folded over to interlock them to form a rigid joint. I have found that with this method the central portion of the die can be effectively supported and practically any lengths of shapes can be extruded, and that the finished tubular shape is practically as strong and effective as would be a tubular seamless shape.

Referring more particularly to Figs. 1 and 2 in which an example shape and method of making is illustrated, the shape shown is of a simple rectangular cross section of substantially uniform thickness, but this of course is used merely by way of illustration, as practically any desired shape or cross section may be used, a few examples of which are illustrated in Figs. 3 to 8. It will be evident that such shapes in tubular members could not be produced without extremely high expense by any other method than extruding through suitably shaped dies. In carrying out my method, a die is constructed of the proper shape to extrude the section with a longitudinal gap or opening for its entire length along one side. Thus, as shown in Fig. 1 the section is extruded with the opposite sides 10 and 11 separated considerably wider than they are in the finished shape to thus provide a gap 12 extending longitudinally along one side. This gap permits the provision of the necessary support for the central portion of the die through which the metal is extruded. The die is also so constructed that complementary locking members are provided along the opposite sides of this gap 12. Thus, the portion 13 of the side wall is provided with a longitudinal groove 14 and overhanging rib or flange 15 extruded as an integral part of the section. Also the opposite portion 16 of this wall is provided with a longitudinally extending tongue or rib 17 extruded as an integral part of the section. After the section has been extruded in this shape, the side walls 10 and 11 can be forced toward each other to seat the tongue or rib 17 in the groove 14 and then the flange or rib 15 can be folded down over the tongue 17 to securely interlock the two opposite sides 13 and 16 together. For this purpose, the rib or tongue 17 may be so shaped as to form a shoulder 18 over which the flange 15 is folded to interlock the two sections together. Of course, this rib 17 is not necessarily of the shape shown in Fig. 1, but may be of other shapes such for example as that shown at 19 in Figs. 4, 6 and 8, or the groove may be formed as indicated at 22 on the side portion 13, as shown in Fig. 9 and the overlapping or locking flange or rib 20 corresponding to the flange or rib 15 in Fig. 1, may be formed on the section 16 carrying the rib 21 to seat in the groove 22, and this flange 20 folded over the shoulder 23 to lock the two portions together. It is also preferred to extrude the section with the wall 28 opposite the open side inwardly curved as shown so that when the sides 10 and 11 are forced together it will naturally assume the flat condition.

The open extruded section may be closed and the interlocking joint set by different means. A satisfactory means is to pass this section through a suitable die or between rollers which will force the sides 13 and 16 together to seat the tongue 17 in the groove 14 and fold over the flange 15 to complete the interlocking of the joint. It is preferred to form along the edge of the portion 13 a longitudinal shoulder 24 to abut a similar shoulder 25 on the opposite portion 15 so that when the joint is closed these shoulders will meet on the outer surface as indicated in Fig. 2 and make a tight joint, and the outer surfaces 26 and 27 of the two portions 13 and 16 will be continuations of each other. Thus, the section as completed in Fig. 2 is to all intents and purposes practically the equivalent of a shape extruded in one piece and seamless, as the locked joint is practically as strong as an integral wall would be and the thin line formed by the abutting shoulders 24 and 25 is hardly noticeable.

As indicated above, Figs. 3 to 8 show by way of example a number of different tubular shapes which may be effectively made by this method. Of course, there are a large number of other shapes which may be made in the same manner. All of them, however, are extruded first as indicated in Fig. 1 in what may be termed the open condition, that is, with the opposite sides separated to leave a longitudinal gap along one side, and then these sides are later forced together to bring the complementary members of the interlocking joint together and one side is folded over to complete the interlocking of the joint.

Having thus set forth the nature of my invention, what I claim is:

1. The process of making tubular extruded shapes which comprises extruding metal through a die to form the shape in an integral piece open longitudinally along one side with a complementary tongue and groove formed along the opposed edges on opposite sides of said opening, then forcing the opposite sides together to bring the tongue into the groove, and folding one side of the groove around the tongue to interlock them together and form a closed section.

2. The process of making tubular extruded shapes which comprises extruding metal through a die to form an integral member having opposite side portions separated longitudinally along one side and with complementary means along the edges on opposite sides of the opening adapted to interlock, then forcing the opposite sides together to close said opening and bring the complementary members together, and interlocking said members to secure the sides together.

3. The process of making tubular extruded shapes which comprises extruding metal through a die to form an integral member having opposite side portions separated longitudinally along one side and with a complementary rib and groove along the edges on opposite sides of the opening, said groove being adapted to receive the rib therein, then forcing the sides of the member together to cause the rib to seat in the groove, and folding the inner wall of the groove over the rib to lock the sides together.

4. The process of making tubular extruded shapes which comprises extruding metal through a die to form an integral member having opposite side portions separated longitudinally along one side and with a complementary rib and groove extending longitudinally along the edges on opposite sides of the opening, then forcing the sides of the member together to cause the rib to seat in the groove, and folding the inner wall of the groove over the rib to lock the sides together, the groove and rib being so spaced from the outer surfaces of said side walls that when interlocked the edges abut at these surfaces and the surfaces are continuations of each other.

5. The process of making tubular extruded shapes which comprises extruding metal through a die to form the shape in an integral piece open longitudinally along one side with a complementary tongue and groove formed along the opposed edges on opposite sides of said opening and an integral longitudinal flange adjacent one of said complementary elements and a longitudinal shoulder adjacent the other, then forcing the opposite sides together to close said opening and seat the tongue in the groove, and folding the flange over said shoulder to lock the sides together.

6. A tubular section of extruded metal having a longitudinal joint along one side comprising a longitudinal groove and a longitudinal rib seated therein, the inner side of the groove being folded over the rib to lock the sides of the tube together, and the rib and groove being spaced inwardly from the outer surface of the tube so that when interlocked the opposite sides of the joint abut at the outer surface and the portions of this surface on opposite sides of the joint form continuations of each other.

In testimony whereof I affix my signature.

GEORGE F. WESTERMAN.